(12) United States Patent  
Park

(10) Patent No.: US 7,304,695 B2  
(45) Date of Patent: Dec. 4, 2007

(54) LIQUID CRYSTAL MODULE COMPRISING A STOPPER INCLUDING A CONVEX STEP COVERAGE PROTRUDING FROM SUPPORT MAIN AND A CONCAVE STEP COVERAGE DEFINED AT LIGHT GUIDE PLATE

(75) Inventor: Jae Woo Park, Kumi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 16 days.

(21) Appl. No.: 10/744,383

(22) Filed: Dec. 24, 2003

(65) Prior Publication Data

US 2004/0160549 A1   Aug. 19, 2004

(30) Foreign Application Priority Data

Feb. 18, 2003   (KR) .................. 10-2003-0010181

(51) Int. Cl.  
*G02F 1/1335*   (2006.01)

(52) U.S. Cl. .................. 349/65; 349/58; 362/615; 362/632

(58) Field of Classification Search ............ 349/60–63, 349/65, 58, 59; 362/615, 632, 633, 634, 362/362, 364, 369  
See application file for complete search history.

(56) References Cited

U.S. PATENT DOCUMENTS 6,595,651 B2 *   7/2003   Jeong et al. ................. 362/600  
6,827,461 B2 *   12/2004   Kao ........................... 362/633

* cited by examiner

*Primary Examiner*—Thoi V. Duong  
(74) *Attorney, Agent, or Firm*—McKenna Long & Aldridge LLP

(57) ABSTRACT

A liquid crystal display module for preventing cracking of a light guide plate and light leakage is provided. The module includes a backlight unit having a lamp and a light guide plate disposed on a support main. A stopper protrudes from the support main into the light guide plate. A step coverage is defined at the light guide plate which includes an incline plane and is restrained by the stopper. Accordingly, a crack of the stopper caused by an external impact and light leakage caused by the crack is prevented.

21 Claims, 8 Drawing Sheets

LIQUID CRYSTAL MODULE COMPRISING A STOPPER INCLUDING A CONVEX STEP COVERAGE PROTRUDING FROM SUPPORT MAIN AND A CONCAVE STEP COVERAGE DEFINED AT LIGHT GUIDE PLATE

This application claims the benefit of Korean Patent Application No. 2003-10181, filed on Feb. 18, 2003, which is hereby incorporated by reference for all purposes as if fully set forth herein.

BACKGROUND OF THE INVENTION

1. Field of the Invention

This invention relates to a liquid crystal display module, and more particularly to a liquid crystal display panel that is capable of preventing cracking of a light guide plate and light leakage.

2. Description of the Related Art

Generally, a liquid crystal display (LCD) includes a liquid crystal display module, driving circuitry for driving the liquid crystal display module, and a case.

The liquid crystal display module consists of a liquid crystal display panel having liquid crystal cells arranged in a matrix between two glass substrates, and a backlight unit for irradiating a light onto the liquid crystal display panel. The liquid crystal display module is arranged with optical sheets which vertically raise a light progressing from the backlight unit toward the liquid crystal display panel.

The liquid crystal display panel, the backlight unit and the optical sheets must be engaged with each other in an integral shape in order to prevent light loss. Likewise, the formation of the liquid crystal display panel, the backlight unit and the optical sheets as an integral shape protects the same from damage caused by external impacts. A case for the LCD enclosing the back light unit and the optical sheets including the edge of the liquid crystal display panel is provided in order to prevent light loss and damage to the LCD.

Referring to FIG. 1 and FIG. 2, a conventional liquid crystal display module includes a support main 14, a backlight unit and a liquid crystal display panel 6 disposed at an inside of the support main 14, and a case top 2 for enclosing the edge of the liquid crystal display panel 6 and the support main 14.

The liquid crystal display panel 6 comprises an upper substrate 3 and a lower substrate 5. A liquid crystal is injected between the upper substrate 3 and the lower substrate 5, and the liquid crystal display panel 6 is provided with a spacer (not shown) for maintaining a gap between the upper substrate 3 and the lower substrate 5. The upper substrate 3 of the liquid crystal display panel 6 is provided with a color filter, a common electrode and a black matrix, among other components. A signal wiring, such as a data line and a gate line, (not shown) or the like, is formed at the lower substrate 5 of the liquid crystal display panel 6, and a thin film transistor (TFT) is formed at an intersection between the data line and the gate line. The TFT switches a data signal to be transmitted from the data line into the liquid crystal cell in response to a scanning pulse (i.e., a gate pulse) from the gate line. A pixel electrode is formed at a pixel area between the data line and the gate line. One side of the lower substrate 5 is provided with pad areas connected to the data lines and the gate lines. A tape carrier package mounted with a driver integrated circuit for applying a driving signal to the TFT is attached onto a pad area of the pad areas. The tape carrier package applies data signals and scanning signals from the driver integrated circuit to the data lines and the gate lines, respectively.

An upper polarizing sheet 4a is attached to the upper substrate 3 of the liquid crystal display panel 6 while a lower polarizing sheet 4b is attached to the rear side of the lower substrate 5 of the liquid crystal display panel 6. The upper and lower polarizing sheets 4a and 4b enlarge a viewing angle of a picture displayed by a liquid crystal cell matrix.

The support main 14 is a molded product, and an inner side wall surface is molded into a stepped coverage face. An inner bottom layer of the support main 14 is mounted with a backlight unit including a reflective sheet 12, a light guide plate 10, a plurality of optical sheets 8 and a lamp housing (not shown).

As shown in FIG. 3, the backlight unit includes a lamp 20, a lamp housing (not shown) for enclosing the lamp 20, a light guide plate 10 which allows passage of light input from the lamp 20 into the liquid crystal display panel 6, a reflective sheet 12 arranged at a rear side of the light guide plate 10, and a plurality of optical sheets 8 disposed on the light guide plate 10.

A light generated from the lamp 20 is incident, via an incidence face defined at a side surface of the light guide plate 10, into the light guide plate 10. The lamp housing reflects a light from the lamp 20 into an incidence face of the light guide plate 10.

The reflective sheet 12 re-reflects a light incident thereto through the rear side of the light guide plate 10 into the light guide plate 10, thereby reducing light loss. In other words, if a light from the lamp 20 is incident to the light guide plate 10, then a light which traveled into a lower surface and the side surface of the light guide plate 10 is reflected by the reflective sheet 12 thereby traveling toward a front side thereof.

The light guide plate 10 converts a light input with the incidence face from the lamp 20 into a plane light source. The light guide plate 10 then outputs the light to the liquid crystal display panel 6.

The plurality of optical sheets 8 vertically raise a light output from the light guide plate 10, thereby improving light efficiency. Diffusing sheets are provided which diffuse light output from the light guide plate 10 into the entire area. Two prism sheets are also provided which raise a progress angle of the light diffused by the diffusing sheets vertically with respect to the liquid crystal display panel 6. Thus, a light output from the light guide plate 10 is incident, via the diffusing sheets and the plurality of optical sheets 8, to the liquid crystal display panel 6.

The case top 2 is formed in a square band shape having a plane part bent perpendicularly and a side part bent perpendicularly. The case top 2 encloses an edge of the liquid crystal display panel 6 and the support main 14.

In order to prevent breakage of the lamp 20 from shaking of the light guide plate 10, each side of the support main 14 and the light guide plate 10 has a stopper 30 for securing the light guide plate 10 as shown in FIG. 3 and FIG. 4. The stopper 30 has a convex step coverage 24 protruding from the side wall of the support main 14 into the light guide plate 10. The stopper 30 also has a concave step coverage 22 defined at each side surface of the light guide plate 10. Thus, the convex step coverage 24 formed at the support main 14 contacts the concave step coverage 22 of the light guide plate 10, thereby restraining the light guide plate. However, if a strong impact is applied to the support main 14 or the light guide plate 10, the impact transfers to the concave step coverage 22 of the light guide plate 10 thereby generating a crack 26 at the light guide plate 10 as shown in FIG. 4. The crack 26 causes light leakage.

In order to minimize the generation of the crack 26, each corner of the concave step coverage 22 of the light guide plate 10 and the stopper 30 has a rounding R. The rounding R has a rounded shape as shown in FIG. 4. However, since the concave step coverage 22 of the light guide plate 10 is joined with the convex step coverage 24 of the support main 14, a friction on the support main 14 is produced when the rounding R of the concave step coverage 22 is large thereby causing noise.

Furthermore, in conventional liquid crystal modules, each edge of the light guide plate is darker than other portion thereof due to the concave step coverage 22 of the light guide plate 10.

SUMMARY OF THE INVENTION

Accordingly, it is an advantage of the present invention to provide a liquid crystal display panel that is capable of preventing cracking of a light guide plate as well as light leakage.

In order to achieve these and other advantages of the invention, a liquid crystal display module according to an embodiment of the present invention includes a support main; a backlight unit having a lamp and a light guide plate disposed on the support main; a stopper protruding from the support main into the light guide plate; and a step coverage hole defined at the light guide plate which includes an incline plane and restrained by the stopper.

In the liquid crystal display module, the step coverage hole includes a horizontal plane opposed to the stopper. In addition, the incline plane is inclined at an incline angle other than 90° from the horizontal plane.

Herein, each corner of the step coverage hole has a rounding.

A dimension of the rounding depends upon a slope of the incline plane.

In one embodiment of the present invention, the rounding has a radius of more than 0.3 mm.

The stopper includes a horizontal plane protruding from the support main. The stopper also has a vertical plane vertically bent from the horizontal plane.

Alternatively, the stopper includes a horizontal plane protruding from the support main and an incline plane inclined from the horizontal plane into the support main.

The stopper is a protrusion protruding from the support main.

The liquid crystal display module further includes a liquid crystal display panel disposed on the backlight unit that is disposed on the support main and a case top for enclosing an edge of the liquid crystal display panel and a side surface of the support main.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENT

Figure 1:
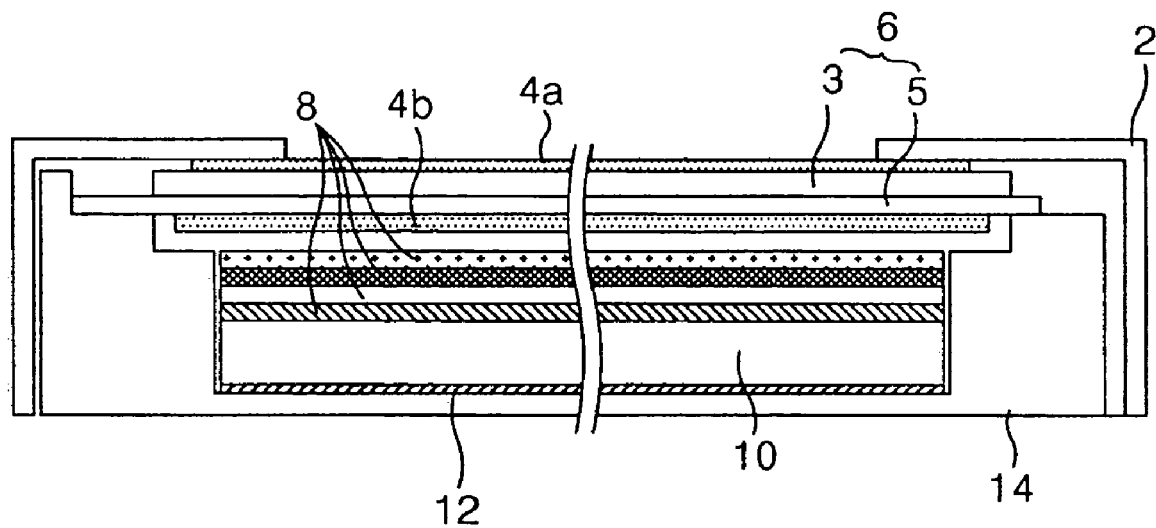
FIG. 1 is a schematic section view showing a structure of a related art liquid crystal display module.
Figure 2:
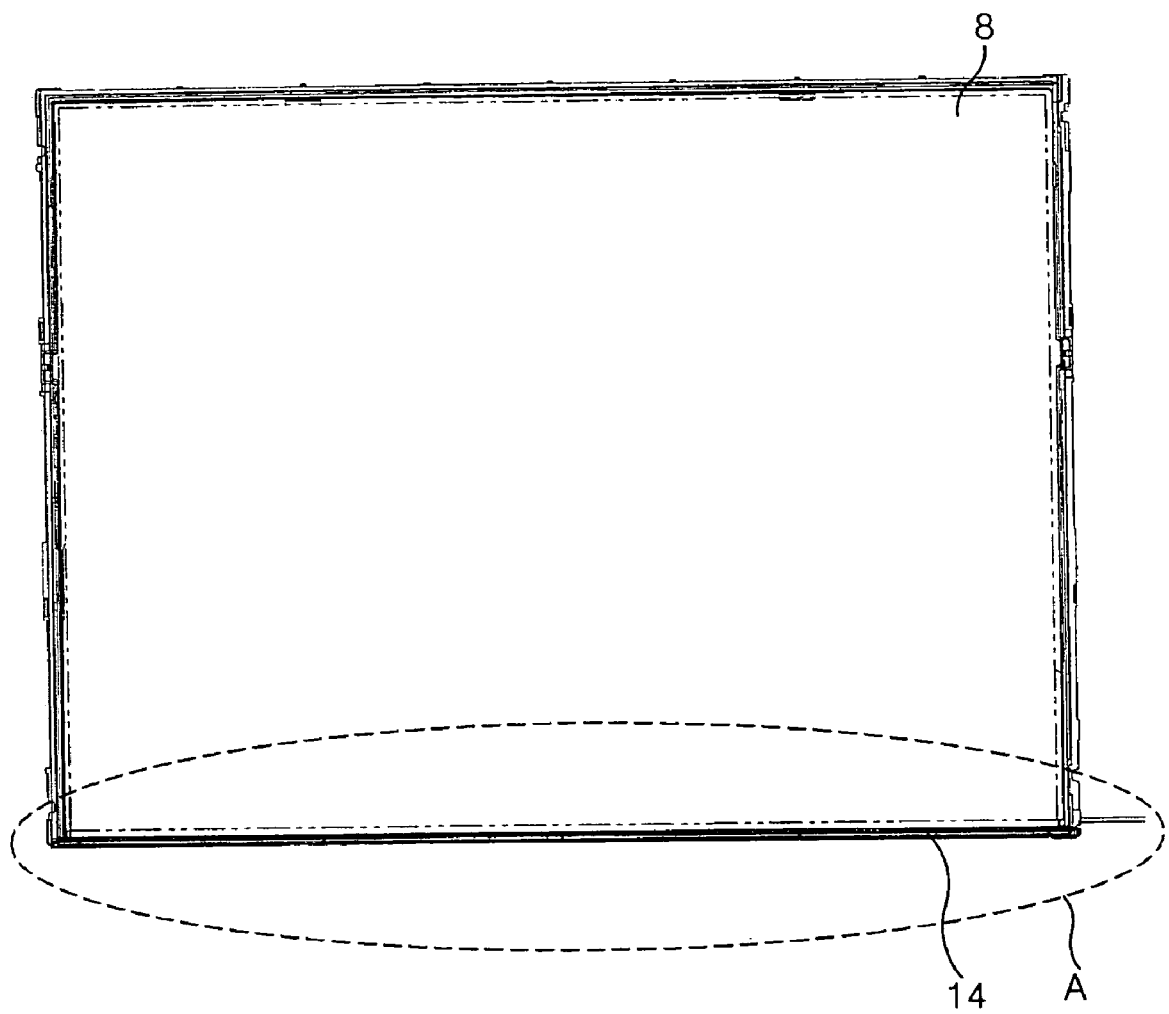
FIG. 2 is a schematic plan view of a related liquid crystal display module.
Figure 3:
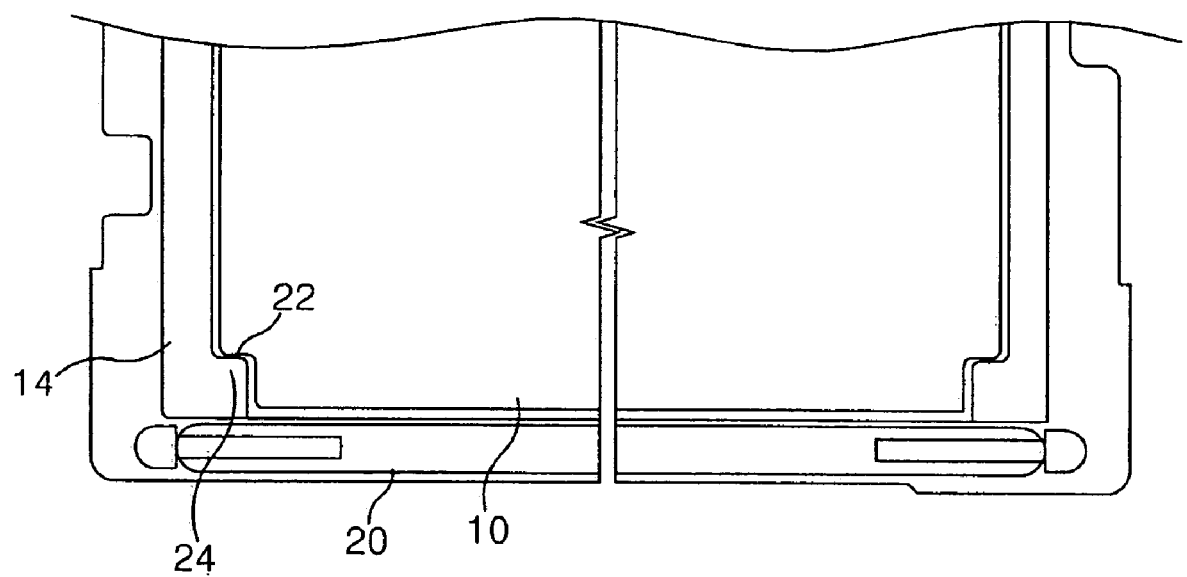
FIG. 3 schematically illustrates a section A shown in FIG. 2.
Figure 4:
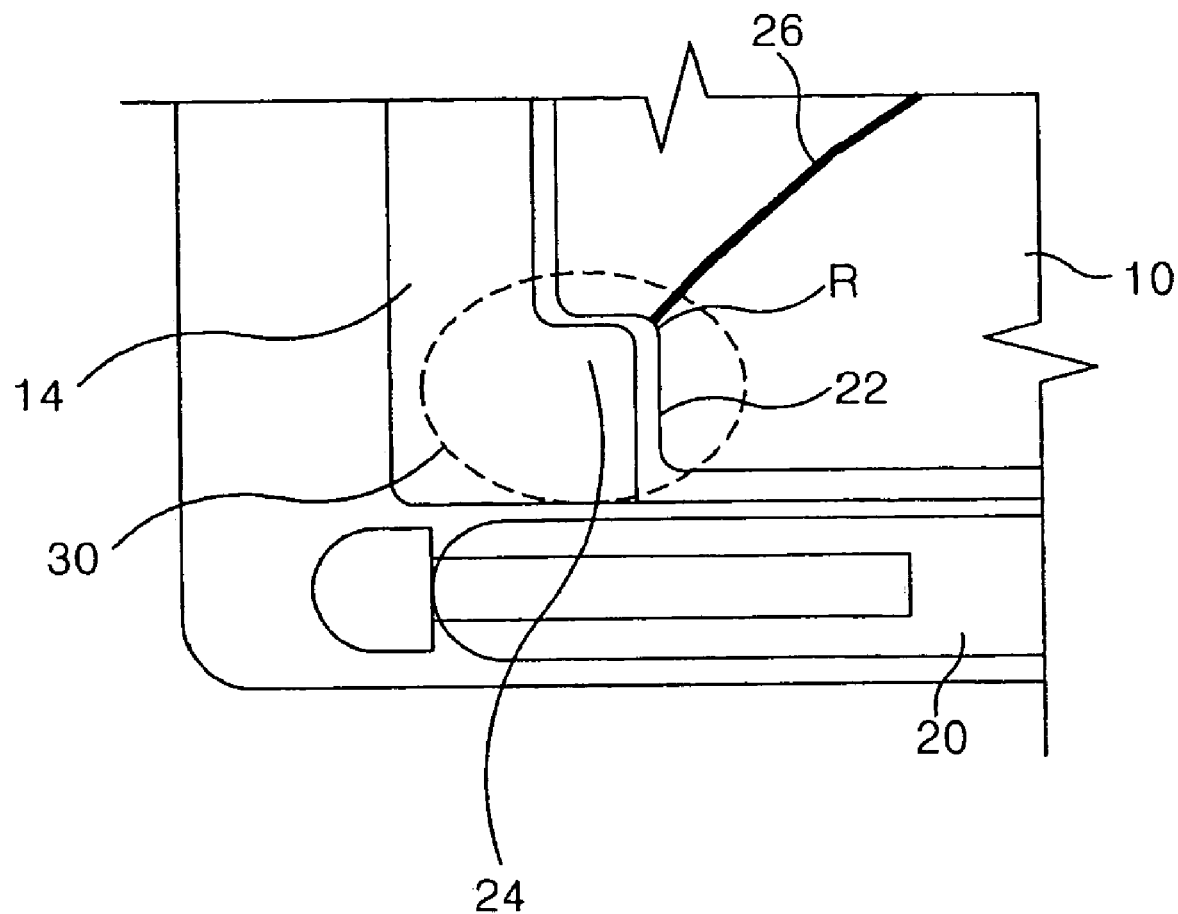
FIG. 4 illustrates a stopper shown in FIG. 3.
Figure 5:
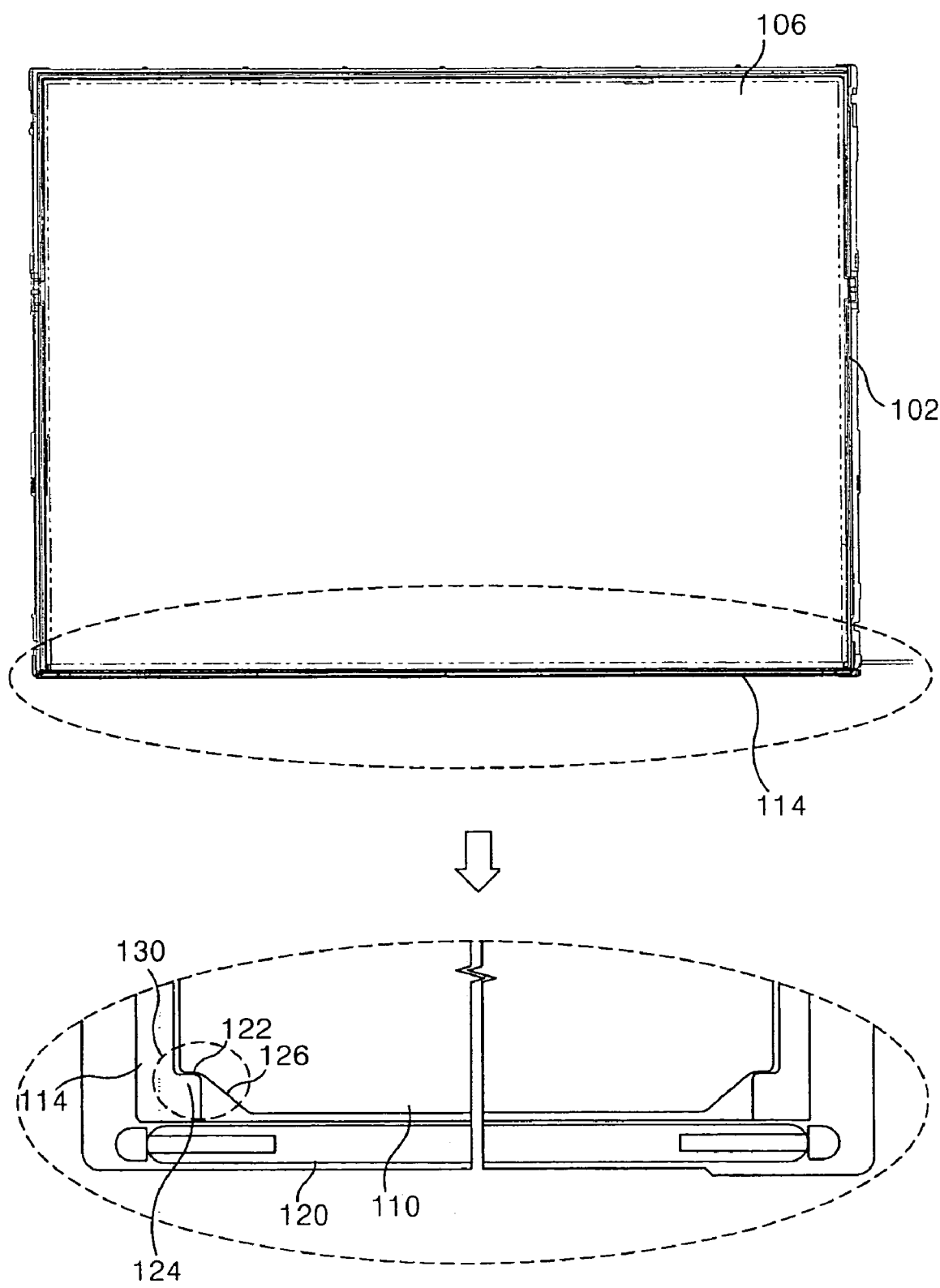
FIG. 5 illustrates a liquid crystal display module according to a first embodiment of the present invention.

Referring to FIG. 5, a liquid crystal display module according to a first embodiment of the present invention includes a support main 114, a backlight unit and a liquid crystal display panel 106 disposed at an inside of the support main 114. The liquid crystal display module according to the first embodiment also has a case top 102 for enclosing an edge of the liquid crystal display panel 106 and a side surface of the support main 114.

The liquid crystal display panel 106 includes an upper substrate and a lower substrate (not shown). A liquid crystal is injected between the upper substrate and the lower substrate, and the liquid crystal display panel 106 is provided with a spacer (not shown) for maintaining a gap between the upper substrate and the lower substrate. The upper substrate of the liquid crystal display panel 106 includes a color filter, a common electrode, a black matrix or the like. A signal wiring such as a data line, a gate line, or the like (not shown) is formed at the lower substrate of the liquid crystal display panel 106, and a thin film transistor (TFT) is formed at an intersection between the data line and the gate line. The TFT switches a data signal to be transmitted from the data line to the liquid crystal cell in response to a scanning pulse (i.e., a gate pulse) from the gate line. A pixel electrode is formed at a pixel area between the data line and the gate line. One side of the lower substrate is provided with pad areas connected to the data lines and the gate lines. A tape carrier package mounted with a driver integrated circuit for applying a driving signal to the TFT is attached to one of the pad areas. The tape carrier package applies data signals and scanning signals from the driver integrated circuit to the data lines and the gate lines, respectively.

An upper polarizing sheet (not shown) is attached to the upper substrate of the liquid crystal display panel 106 while a lower polarizing sheet (not shown) is attached to the rear side of the lower substrate of the liquid crystal display panel 106. In this embodiment, the upper and lower polarizing sheets enlarge a viewing angle of a picture displayed by a liquid crystal cell matrix.

The support main 114 is molded and the inner side wall surface is molded into a stepped coverage face. The inner bottom layer of the support main 114 is mounted with a backlight unit including a reflective sheet (not shown), a light guide plate 110, a plurality of optical sheets (not shown) and a lamp housing (not shown).

The backlight unit includes a lamp 120, a lamp housing (not shown) for enclosing the lamp 120, a light guide plate 110 for transmitting a light input from the lamp 120 into the liquid crystal display panel 106, a reflective sheet arranged at the rear side of the light guide plate 110, and a plurality of optical sheets disposed on the light guide plate 110.

A light generated from the lamp 120 is incident, via an incidence face defined at the side surface of the light guide plate 110, to the light guide plate 110. The lamp housing reflects a light from the lamp 120 into an incidence face of the light guide plate 110.

The reflective sheet re-reflects a light incident thereto through the rear side of the light guide plate 110 into the light guide plate 110, thereby reducing light loss. In other words, if light from the lamp 120 is incident to the light guide plate 110, then a light having traveled to the lower surface and the side surface of the light guide plate 110 is reflected by the reflective sheet thereby traveling toward the front side thereof.

The light guide plate 110 converts light input, via the incidence face, from the lamp 120 into a plane light source. The light guide plate 110 also outputs the light to the liquid crystal display panel 106. The plurality of optical sheets vertically raise light output from the light guide plate 110 thereby improving light efficiency. Diffusing sheets are provided which diffuse light output from the light guide plate 110 to the entire area Two prism sheets are also provided which raise a progress angle of the light diffused by the diffusing sheets vertically with respect to the liquid crystal display panel 106. Thus, light output from the light guide plate 110 is incident, via the diffusing sheets and the plurality of optical sheets 8, to the liquid crystal display panel 106.

The case top 102 is formed in a square band shape having a plane part bent perpendicularly and a side part bent perpendicularly. The case top 102 encloses an edge of the liquid crystal display panel 106 and the support main 114.

In order to prevent breakage of the lamp 120 from shaking of the light guide plate 110, each side of the support main 114 and the light guide plate 110 has a stopper 130 which secures the light guide plate 110. The stopper 130 includes a convex step coverage 124 protruding from the side wall of the support main 114 into the light guide plate 110, and a concave step coverage 122 with an incline plane 126 defined at each side surface of the light guide plate 110. Thus, the convex step coverage 124 formed at the support main 114 contacts the concave step coverage 122 having the incline plane 126 of the light guide plate 110, thereby minimizing shaking of the light guide plate 110. The convex step coverage 124 of the support main 114 restrains the concave step coverage 122 of the light guide plate 110, thereby preventing movement of the light guide plate 110 into the lamp 120.

Figure 6:
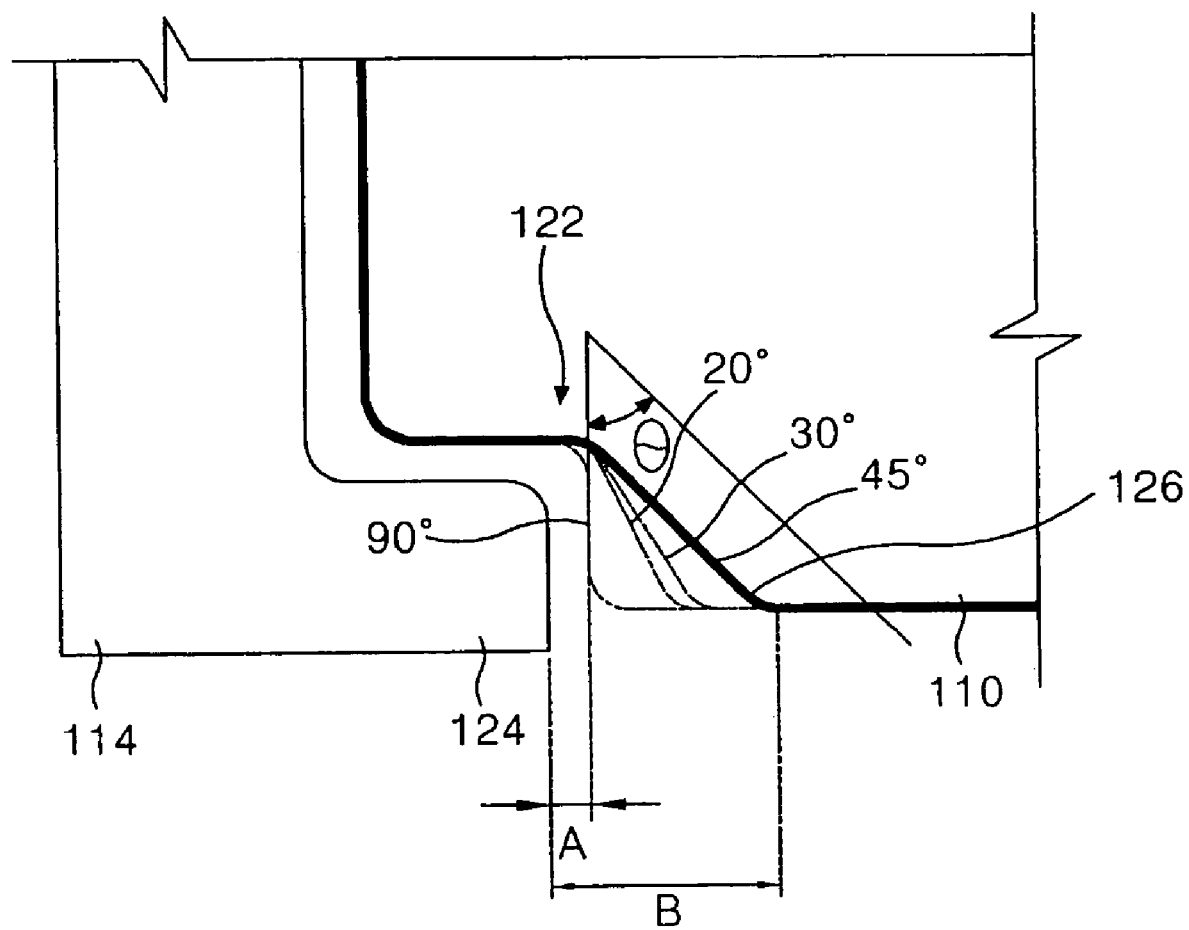
FIG. 6 illustrates a stopper shown in FIG. 5.

More specifically, as shown in FIG. 6, the step coverage 122 with the incline plane 126 of the light guide plate is provided with a stepped part. The stepped part is vertically bent inwardly at the side surface of the light guide plate 110. In addition, the incline plane 126 is inclined from the stepped part. Since the concave step coverage 122 of the light guide 110 is formed in an inclined manner, a gap B between the convex step coverage 124 of the support main 114 and the concave step coverage 122 of the light guide plate is greater than a gap A as found in the related art.

The corner formed at the step coverage 122 of the light guide plate 110 includes a rounding. A dimension of the rounding to be formed at the corner of the step coverage 122 with the incline plane 126 of the light guide plate 110 is differentiated depending upon a slope of the incline plane 126 as seen from the examples of the following table:

TABLE 1

| Angle of Incline plane (Degrees°) | Maximum Size of Rounding (Radius) |
|---|---|
| 5° | 0.35 mm |
| 10° | 0.4 mm |
| 20° | 0.5 mm |

TABLE 1-continued

| Angle of Incline plane (Degrees°) | Maximum Size of Rounding (Radius) |
|---|---|
| 45° | 0.9 mm |
| 90° | 0.3 mm |

Making reference to both the above Table and FIG. 6, a rounding size to be formed at the corner defined at the step coverage 122 of the light guide plate 110 according to a slope of the incline plane 126 as seen from Table 1 will be described.

First, a maximum size of the rounding to be formed at the corner defined at the step coverage of the conventional light guide plate has a radius of about 0.3 mm when an incline angle θ is 90°. In a first embodiment, a size of the rounding formed at the corner defined at the step coverage 122 of the light guide plate 110 has a radius of about 0.4 mm when the incline angle θ is 10° (i.e., 100° from a horizontal plane of the light guide plate 110). Further, a size of the rounding formed at the corner defined at the step coverage 122 of the light guide plate 110 has a radius of about 0.5 mm when an incline angle θ is 20° (i.e., 110° from the horizontal plane of the light guide plate 110). Furthermore, a size of the rounding formed at the corner defined at the step coverage 122 of the light guide plate 110 has a radius of about 0.9 mm when an incline angle θ is 45° (i.e., 135° from the horizontal plane of the light guide plate 110). As may be appreciated, the incline plane of the light guide plate 110 has an incline angle other than 90° from the horizontal plane.

In the liquid crystal display module according to the first embodiment of the present invention, the concave step coverage 122 of the light guide plate is formed in an inclined manner, thereby increasing a rounding size formed at the corner defined at the step coverage 122 of the light guide plate 110. The increase of the rounding size of the corner defined at the step coverage 122 of the light guide plate 110 minimizes the previously described problems of the prior art. More specifically, the increased rounding size minimizes external impacts transferred to the corner thereby preventing the formation of cracks at the light guide plate 110. As mentioned earlier, the size of the gap B between the convex step coverage 124 of the support main 114 and the concave step coverage 122 of the light guide plate 110 is greater than the conventional gap A. The increased size of the gap B minimizes noise caused by friction on the support main 114. The incline plane 126 of the concave step coverage 122 of the light guide plate 110 brightens each edge area of the light guide plate 110. The increased brightness at the edge area of the light guide plate 110 minimizes edge darkness.

Figure 7:
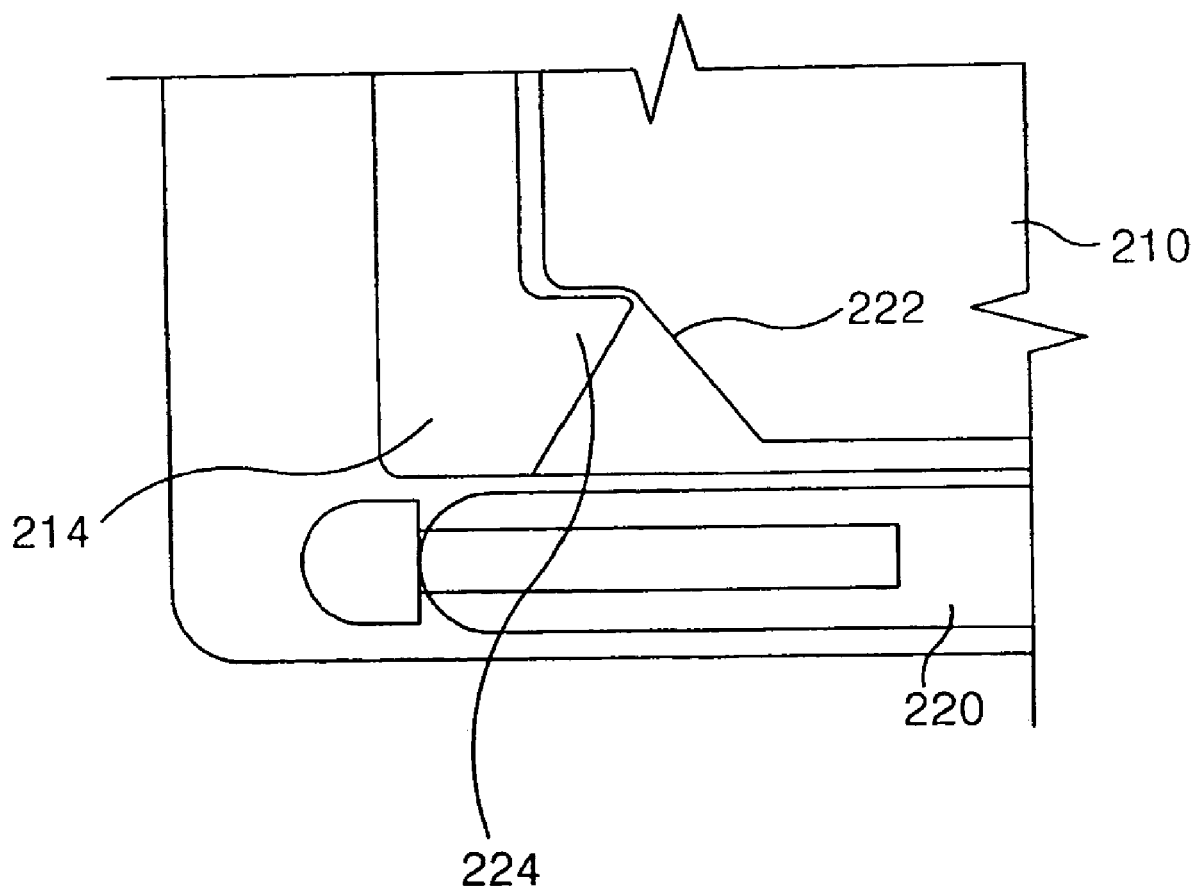
FIG. 7 illustrates a stopper of a liquid crystal display module according to a second embodiment of the present invention.

Referring to FIG. 7, a liquid crystal display module according to a second embodiment of the present invention is shown. The liquid crystal display module according to the second embodiment has elements similar to the liquid crystal display module discussed with reference to FIG. 5. Therefore, an explanation of similar elements will be omitted.

In the liquid crystal display module according to the second embodiment, a convex step coverage 224 defined at a support main 214 has a horizontal plane protruding from a stepped part of the support main 214 into a light guide plate 210, and an incline plane protruding such that the incline plane is inclined from the horizontal plane into the stepped part of the support main 214. The horizontal plane of the convex step coverage 224 of the support main 214 restrains a horizontal plane of a concave step coverage 222 with the incline plane of the light guide plate 210. A protrusion defined at the support main 214 restrains movement of the light guide plate 210 into a lamp 220.

Figure 8:
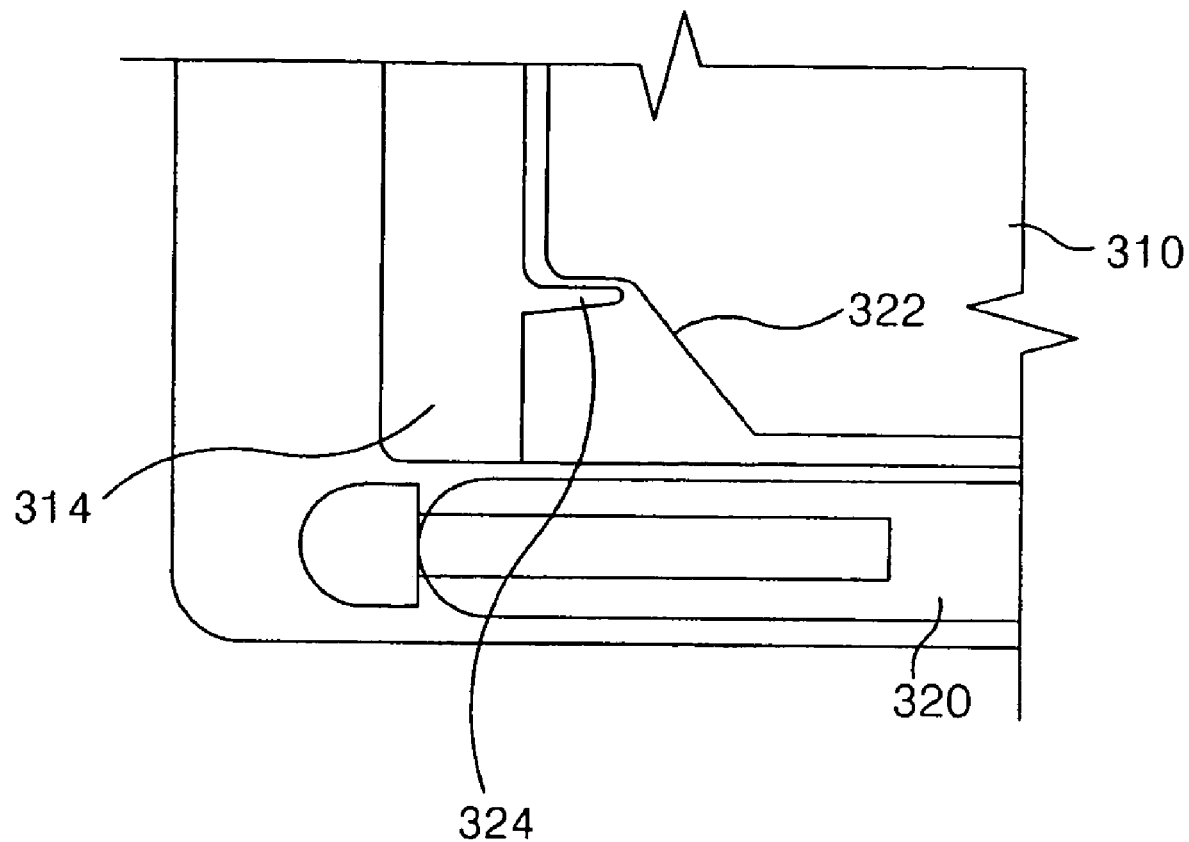
FIG. 8 illustrates a stopper of a liquid crystal display module according to a third embodiment of the present invention.

Alternatively, referring to FIG. 8, there is shown a liquid crystal display module according to a third embodiment of the present invention. The liquid crystal display module according to the third embodiment has elements similar to the liquid crystal display module discussed with reference to FIG. 5. Therefore, an explanation of the similar elements will be omitted.

In the liquid crystal display module according to the third embodiment, a stopper 324 formed at a support main 314 is provided with a protrusion. The protrusion protrudes from a stepped part of the support main 314 into a light guide plate 310. The protrusion of the support main 314 restrains a horizontal plane of a concave step coverage 322 having an incline plane of the light guide plate 310. Thus, the protrusion defined at the support main 314 restrains movement of the light guide plate 310 into the lamp 320.

As described above, in the liquid crystal display module according to the present invention, both the support main and the light guide plate are provided with the stopper, thereby preventing damage of the lamp from shaking of the light guide plate. In addition, the stopper of the light guide plate has an incline plane. Accordingly, a size of the rounding to be defined at the corner of the stopper depends upon a slope of the incline plane. It should be noted that the incline plane is greater than the prior art. As a result, the present invention prevents cracking of the stopper caused from external impacts. As such, light leakage caused by the crack can be prevented.

Furthermore, friction on the stopper can be reduced thereby preventing noise generation. Moreover, a gap between the stopper of the support main and the stopper of the light guide plate can be enlarged in order to minimize darkness at each side of the light guide plate.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display module, comprising:
a support main;
a backlight unit having a lamp and a light guide plate, the backlight unit disposed on the support main;
a stopper including a first step coverage protruding from the support main towards the light guide plate, the first step coverage being substantially parallel to a portion of the support main; and
a second step coverage defined at the light guide plate and substantially restrained by the first step coverage, the second step coverage including an incline plane and a rounding within a range of about 0.3 mm to about 0.9 mm, wherein the incline plane is at an angle relative to the first step coverage.

2. The liquid crystal display module according to claim 1, wherein the second step coverage includes a horizontal plane disposed opposite the stopper, where the incline plane is at an angle other than 90° from the horizontal plane.

3. The liquid crystal display module according to claim 2, wherein each corner of the second step coverage has a rounding.

4. The liquid crystal display module according to claim 3, wherein a dimension of the rounding depends upon a slope of the incline plane.

5. The liquid crystal display module according to claim 3, wherein the rounding has a radius of more than 0.3 mm.

6. The liquid crystal display module according to claim 1, wherein the stopper further includes:
a horizontal plane protruding from the support main; and
a vertical plane vertically extending from the horizontal plane.

7. The liquid crystal display module according to claim 1, wherein the stopper further includes:
a horizontal plane protruding from the support main; and
an incline plane inclined from the horizontal plane into the support main.

8. The liquid crystal display module according to claim 1, wherein the stopper is a protrusion substantially protruding from the support main.

9. The liquid crystal display module according to claim 1, further comprising:
a liquid crystal display panel disposed on the backlight unit that is disposed on the support main; and
a case top, the case top enclosing an edge of the liquid crystal display panel and a side surface of the support main.

10. A liquid crystal display module, the liquid crystal display module comprising:
a support main;
a backlight unit, the backlight unit being mounted with the support main within the liquid crystal display module, the backlight unit having a light guide plate;
a substantially convex step coverage, the convex step coverage substantially protruding from a side wall of the support main into the light guide plate and having a side substantially parallel to a portion of the support main; and
a substantially concave step coverage, the concave step coverage being defined in the light guide plate, the concave step coverage having an incline plane and a rounding within a range of about 0.3 mm to about 0.9 mm, the incline plane being defined at a side surface of the light guide plate wherein the incline plane is at an incline relative to the parallel side of the convex step coverage.

11. The liquid crystal display module according to claim 10, wherein the rounding is formed at a corner of the concave step coverage with the incline plane.

12. The liquid crystal display module according to claim 11, wherein the rounding has a radius of at least 0.3 mm.

13. The liquid crystal display module according to claim 12, wherein the convex step coverage contacts the concave step coverage thereby minimizing shaking of the light guide plate.

14. The liquid crystal display module according to claim 11, wherein the rounding further includes a radius, where a dimension of the radius is determined according to the incline of the incline plane.

15. The liquid crystal display module according to claim 10, wherein the convex step coverage and the concave step coverage form a stopper for restraining the light guide plate.

16. The liquid crystal display module according to claim 10 further comprising a stopper, wherein the stopper further includes:
a horizontal plane protruding from the support main; and
an incline plane inclined from the horizontal plane into the support main.

17. The liquid crystal display module according to claim 10 further comprising a stopper, wherein the stopper further includes:
- a horizontal plane protruding from the support main; and
- a vertical plane vertically extending from the horizontal plane.

18. A liquid crystal display module, the liquid crystal display module comprising:
- a support main;
- a backlight unit, the backlight unit being mounted with the support main, the backlight unit having a light guide plate;
- a first step coverage, the first step coverage substantially protruding from the support main and having a side substantially parallel to a portion of the support main; and
- a second step coverage, the second step coverage being formed in the light guide plate, the second step coverage including a rounding within a range of about 0.3 mm to about 0.9 mm and an incline plane formed in a side surface of the light guide plate wherein the incline plane is at an incline in relation to the parallel side of the first step coverage.

19. The liquid crystal display module according to claim 18, wherein the rounding is formed at a corner of the second step coverage with the incline plane.

20. The liquid crystal display module according to claim 19, wherein the rounding further includes a radius, where a dimension of the radius is determined according to the incline of the incline plane.

21. A method of manufacturing a liquid crystal display module, comprising the steps of:
- forming a support main;
- forming a backlight unit having a lamp and a light guide plate, the backlight unit disposed on the support main;
- forming a stopper including a first step coverage protruding from the support main towards the light guide plate, the first step coverage being substantially parallel to a portion of the support main; and
- forming a second step coverage defined at the light guide plate and substantially restrained by the first step coverage, the second step coverage including an incline plane and a rounding within a range of about 0.3 mm to about 0.9 mm, wherein the incline plane is at an angle relative to the first step coverage; and wherein a gap is formed between the first step coverage and the second step coverage.

* * * * *